United States Patent
Kaji

(10) Patent No.: US 6,390,229 B1
(45) Date of Patent: May 21, 2002

(54) ELECTRIC POWER STEERING SYSTEM

(75) Inventor: Hiroaki Kaji, Yamatokooriyama (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/599,006

(22) Filed: Jun. 22, 2000

(30) Foreign Application Priority Data

Jul. 26, 1999 (JP) .......................................... 11-210231

(51) Int. Cl.[7] .................................................. B62D 5/06
(52) U.S. Cl. ....................................... 180/443; 180/446
(58) Field of Search ................................ 180/443, 446, 180/422, 404, 407; 701/41, 42, 44

(56) References Cited

U.S. PATENT DOCUMENTS 5,988,310 A * 11/1999 Nishino et al. ............. 180/443
6,070,692 A * 6/2000 Nishino et al. ............. 180/443
6,152,255 A * 11/2000 Noro et al. ................. 180/446
6,223,852 B1 * 5/2001 Mukai et al. ............... 180/446

* cited by examiner

Primary Examiner—Brian L. Johnson
Assistant Examiner—Tony Winner
(74) Attorney, Agent, or Firm—Rabin & Berdo, P.C.

(57) ABSTRACT

An electric power steering system is provided, which employs an electric motor as a drive source to apply a steering assist force to a steering mechanism mounted on a motor vehicle in accordance with the operation of an operation member. The electric power steering system includes: a torque sensor which detects a steering torque applied to the operation member and outputs a torque signal in accordance with the detected steering torque; and a motor driving control circuit which outputs a motor driving command signal for driving the electric motor on the basis of the torque signal outputted from the torque sensor. At start or stop of the operation of the electric power steering system, the motor driving command signal is limited in accordance with the magnitude of the steering torque detected by the torque sensor.

5 Claims, 7 Drawing Sheets

ELECTRIC POWER STEERING SYSTEM

BACKGROUND OF THE INVENTION

1. Field of the Invention

The present invention relates to an electric power steering system which employs an electric motor as a drive source which is controlled on the basis of a steering torque.

2. Description of Related Art

Electric power steering systems are conventionally utilized which are adapted to assist a steering operation by transmitting a torque generated by an electric motor to a steering mechanism of a motor vehicle. The electric motor is controlled for driving thereof on the basis of a target current determined depending on a vehicle speed and a steering torque applied to a steering wheel.

However, if an ignition key switch of the motor vehicle is turned on or off with the steering torque being applied to the steering wheel, a driver feels the steering wheel abruptly becoming lighter or heavier upon the start or stop of the electric motor. This deteriorates the upscale image and steering feeling of the motor vehicle. Particularly, where a high power electric motor is employed in an electric power steering system for a larger-scale motor vehicle, the change in the feeling of the steering wheel upon the start or stop of the system is drastic. When the system is deactuated, an abrupt turn-back of the steering wheel may even occur upon the stop of the electric motor.

SUMMARY OF THE INVENTION

It is an object of the present invention to provide an electric power steering system which ensures an improved steering feeling at the start and/or stop of the operation of the electric power steering system.

The electric power steering system according to the present invention, which employs an electric motor (M) as a drive source to apply a steering assist force to a steering mechanism (3) mounted on a motor vehicle in accordance with the operation of an operation member (1), comprises: a torque sensor (5) which detects a steering torque applied to the operation member and outputs a torque signal in accordance with the detected steering torque; a motor driving control circuit (14; 70, S4, S14) which outputs a motor driving command signal for driving the electric motor on the basis of the torque signal outputted from the torque sensor; and an output limitation circuit (12, 21; 70, 5, S15) which limits the motor driving command signal in accordance with the magnitude of the steering torque detected by the torque sensor at start or stop of the operation of the electric power steering system. The parenthesized numerals hereinbefore and hereinafter denote corresponding components employed in the embodiments to be described later.

The output limitation circuit may be software-based or may be based on hardware such as analog circuits.

The operation of the electric power steering system is started when an ignition switch is turned on, or when it is judged that the electric power steering system is restored from a malfunction state to a normal state after the operation of the electric power steering system in malfunction is once stopped. The operation of the electric power steering system is stopped when the ignition switch is turned off, or when it is judged that the electric power steering system suffers from some malfunction.

In accordance with the present invention, the motor driving command signal is limited in accordance with the magnitude of the steering torque at the start and/or stop of the operation of the electric power steering system. Thus, an abrupt change in the steering assist force can be suppressed when the electric power steering system is started or stopped with the steering torque being applied to the operation member such as a steering wheel. Therefore, a feeling obtained from the operation member by an operator (driver) can be improved.

In one embodiment of the present invention, the output limitation circuit (12, 21; 70, S5) more heavily limits the motor driving command signal at the start of the operation of the electric power steering system, as the steering torque detected by the torque sensor is large.

Thus, even if the steering torque is great at the start of the operation of the electric power steering system, there is no possibility that a relatively great steering assist force is abruptly generated. Accordingly, the steering assist force is not steeply increased, so that the steering feeling can be improved.

The output limitation circuit preferably sets a limitation value indicative of a degree of the limitation of the motor driving command signal so that the limitation degree does not increase with time (or decreases with time) at the start of the operation of the electric power steering system.

In another embodiment of the invention, the output limitation circuit (12, 21; 70, S15) more heavily limits the motor driving command signal at the stop of the operation of the electric power steering system, as the steering torque detected by the torque sensor is small.

Thus, when the steering torque is great at the stop of the operation of the electric power steering system, a relatively great steering assist force can continuously be generated. Therefore, there is no possibility that the steering assist force is abruptly eliminated, so that the steering feeling can be improved.

The output limitation circuit preferably sets the limitation value indicative of the degree of the limitation of the motor driving command signal so that the limitation degree does not decrease with time (or increases with time) at the stop of the operation of the electric power steering system.

The foregoing and other objects, features and effects of the present invention will become more apparent from the following description of the preferred embodiments with reference to the attached drawings.

BRIEF DESCRIPTION OF THE DRAWINGS

FIG. 2 is a diagram for explaining an output limitation process to be performed when an ignition switch is turned on;

DESCRIPTION OF THE PREFERRED EMBODIMENTS

Figure 1:
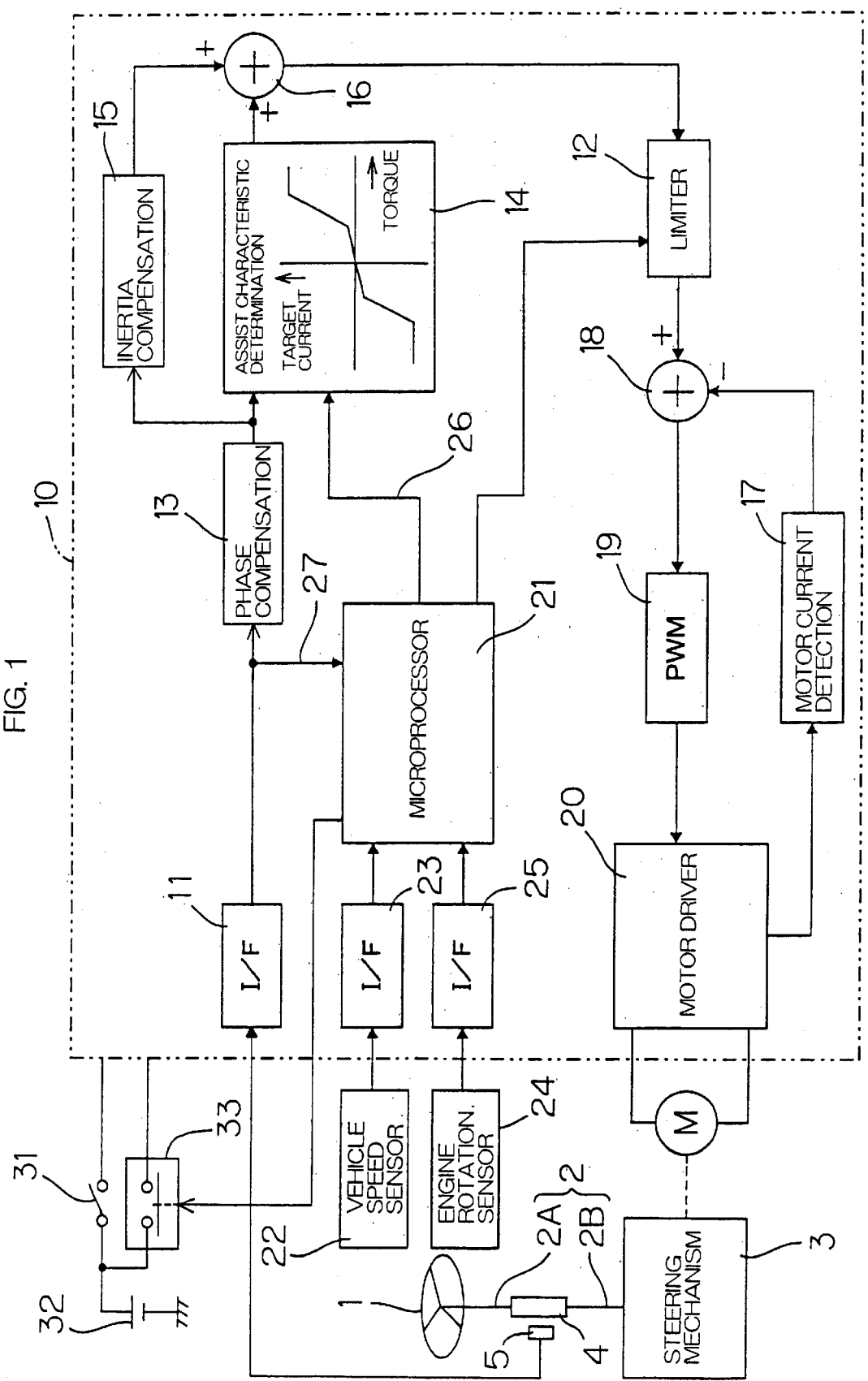
FIG. 1 is a block diagram illustrating the electrical construction of an electric power steering system according to a first embodiment of the present invention.

FIG. 1 is a block diagram illustrating the electrical construction of an electric power steering system according to a first embodiment of the present invention. A steering torque applied to a steering wheel 1 as an operation member is mechanically transmitted to a steering mechanism 3 via a steering shaft 2. A steering assist force is transmitted to the steering mechanism 3 from an electric motor M.

The steering shaft 2 is divided into an input shaft 2A coupled to the steering wheel 1 and an output shaft 2B coupled to the steering mechanism 3, and the input shaft 2A and the output shaft 2B are coupled to each other by a torsion bar 4. The torsion bar 4 is twisted in accordance with the steering torque, and the direction and amount of the torsion of the torsion bar are detected by the torque sensor 5.

The torque sensor 5 is of a magnetic type which is adapted to detect a magnetic resistance which varies in accordance with a change in angular positional relationship between the input shaft 2A and the output shaft 2B. An output signal of the torque sensor 5 is inputted to a controller The controller 10 determines a target current of the electric motor M in accordance with the steering torque detected by the torque sensor 5 to control the driving of the electric motor M so that a steering assist force according to the steering torque can be applied to the steering mechanism 3.

The controller 10 includes an interface circuit (I/F) 11 which receives the torque signal outputted from the torque sensor 5, a phase compensating circuit 13 which compensates the phase of a signal outputted from the interface circuit 11, an assist characteristic determining circuit 14 which generates a target current signal for the torque signal phase-compensated by the phase compensating circuit 13, an inertia compensating circuit 15 which compensates for a response delay attributable to the inertia of the steering mechanism 3 and the electric motor M, an adder circuit 16 which generates a motor driving command signal which is a target current signal subjected to the inertia compensation process by adding an output of the inertia compensation circuit 15 to the output signal of the assist characteristic determining circuit 14, and a limiter circuit 12 which limits the motor driving command signal outputted from the adder circuit 16 as required. Then, a difference between a motor current detected by a motor current detecting circuit 17 and the motor driving command signal from the limiter circuit 12 is determined by a subtractor circuit 18, and a differential signal indicative of the difference is inputted to a PWM (pulse width modulation) convertor circuit 19. The PWM convertor circuit 19 generates a PWM driving signal having a pulse width according to the difference signal. The PWM driving signal is inputted to a motor driver 20 which supplies a current to the electric motor M.

In this embodiment, the limiter circuit 12, the phase compensating circuit 13, the assist characteristic determining circuit 14 and the like are each comprised of an analog circuit.

The controller 10 further includes a microprocessor 21. A vehicle speed signal from a vehicle speed sensor 22 and an engine rotational speed signal from an engine rotation sensor 24 are inputted to the micro processor 21 via interfaces 23 and 25, respectively. The microprocessor 21 variably sets a torque-to-target-current characteristic in the assist characteristic determining circuit 14 via a line 26 depending on the vehicle speed indicated by the vehicle speed signal, thereby realizing a so-called vehicle speed responsive control. More specifically, a steering assist force suitable for the vehicle speed is applied to the steering mechanism 3 by setting the target current to a lower level during high speed traveling and to a higher level during low speed traveling or at stop. The vehicle speed sensor 22 maybe a wheel speed sensor, for example, adapted to detect a wheel rotation speed.

The microprocessor 21 also controls the limiter circuit 12 to limit the output of the motor driving command signal in accordance with the torque signal (the magnitude of the steering torque) outputted from the torque sensor 5 at the start and stop of the operation of the electric power steering system.

Figure 2:
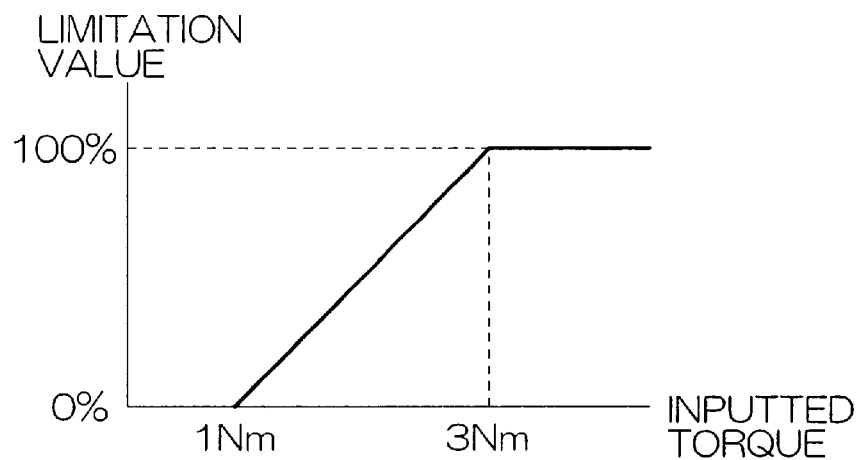

More specifically, when an ignition switch 31 is turned on and a battery voltage from a car battery 32 is applied to the controller 10, the microprocessor 21 more heavily limits the motor driving command signal as the steering torque currently applied is large. That is, when the ignition switch 31 is turned on to start the system, the motor driving command signal is limited in accordance with a limitation value which is set in a linearly variable manner between 0% and 100% for a steering torque between 1 Nm and 3 Nm, as shown in FIG. 2. In this case, a limitation value of 100% corresponds to a state where the motor driving command signal is not outputted (or the target current is zero), and a limitation value of 0% corresponds to a state where the motor driving command signal from the adder circuit 16 is outputted as it is.

More specifically, when the ignition switch 31 is turned on, the motor driving command signal is more heavily limited to limit the driving of the electric motor M as the driver applies a greater steering torque to the steering wheel 1. As the driver thereafter applies a smaller steering torque to the steering wheel 1, the limitation value is reduced in accordance to a characteristic relation as shown in FIG. 2. Once the limitation value is set at a smaller level, the limitation is not imposed to a greater extent than that level. Therefore, even if the driver thereafter applies a greater steering torque, the limitation value is not increased. Thus, the limitation is led to a limitation value of 0% as the steering torque is reduced, whereby the system is gradually effectuated. The limitation value, after having reached 0%, is fixed to 0%. Thereafter, the motor driving command signal will never be limited, unless the system is stopped when a malfunction occurs or the ignition switch 31 is turned off. Therefore, the limitation value is set so as not to increase with time (or so as to decrease with time) at the start of the operation of the electric power steering system.

Since the motor driving command signal is more heavily limited with a greater steering torque at the start of the system, the driver does not feel the steering wheel abruptly becoming lighter when he turns on the ignition switch 31 with his handput on the steering wheel 1. Thus, the steering feeling can be improved.

When the ignition switch 31 is turned off, the cut-off of a battery voltage supply from the vehicle battery 32 is detected. In response thereto, the microprocessor 21 limits the motor driving command signal in the limiter circuit 12 in accordance with the torque signal (the magnitude of the steering torque) detected by the torque sensor 5.

Figure 3:
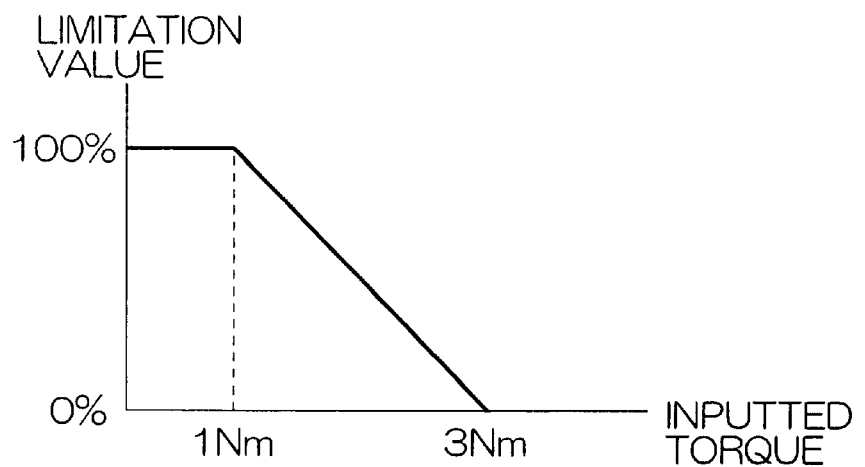
FIG. 3 is a diagram for explaining an output limitation process to be performed when an ignition switch is turned off.

Upon the turn-off of the ignition switch 31, the motor driving command signal is less heavily limited with a greater torque applied to the steering wheel 1, as shown in FIG. 3. More specifically, the motor driving command signal is limited in accordance with the limitation value which is set in a linearly variable manner between 100% to 0% for a steering torque between 1 Nm and 3 Nm.

Therefore, if the driver applies a greater steering torque to the steering wheel 1 when the ignition switch 21 is turned off, the electric motor M generates an accordingly greater assist force. When the steering torque is thereafter reduced, the limitation value is increased in accordance with a characteristic relation as shown in FIG. 3. When the limitation value reaches 100%, the motor driving command signal is reduced to zero (the target current is zero). Once the limitation value is set at a higher level, the limitation is not imposed to a smaller extent than that level. Therefore, even if the steering torque is increased again, the limitation value is not reduced. As the steering torque is reduced, the limitation is led to a limitation value of 100%, whereby the system is gradually deactuated. Accordingly, the limitation value is set so as not to decrease with time (or so as to increase with time) at the stop of the operation of the electric power steering system.

When the limitation value reaches 100%, the microprocessor 21 cuts off a relay 33 (see FIG. 1) to cut off the power supply to the controller 10.

Since the motor driving command signal is less heavily limited with a greater steering torque at the stop of the system, the driver does not feel the steering wheel abruptly becoming heavier when he turns off the ignition switch 31 with his hand put on the steering wheel 1. Thus, the steering feeling can be improved.

When the ignition switch 31 is turn on, the microprocessor 21 brings the relay 33 into conduction, and keeps the relay 33 in conduction as long as the ignition switch 31 is on.

The microprocessor 21 may stop the operation of the motor driver 20, if an abnormality such as breakage of a signal line occurs,for example, when the vehicle speed signal indicates a vehicle speed of 0 km/h with the engine rotational speed signal being outputted. An operation to be performed at this time is substantially the same as the aforesaid operation to be performed when the ignition switch 31 is turned off. Therefore, when a malfunction occurs, there is no possibility that the driver feels the steering wheel abruptly becoming heavier to remarkably deteriorate the steering feeling.

When the system is stopped due to a malfunction, the microprocessor 21 keeps the relay 33 in conduction, and performs a normal state recovery monitoring process to check if the system is recovered to a normal state.

If the system is restored to the normal state after the malfunction is detected (e.g., the system is restored from a contact failure of a signal connector), the operation of the power steering system is resumed. An operation to be performed at this time is substantially the same as the operation to be performed when the ignition switch 31 is turned on. Therefore, even if a greater steering torque is applied to the steering wheel 1 when the system is restored to the normal state, the driver does not feel the steering wheel abruptly becoming lighter. The steering assist force is gradually increased, so that the steering feeling is not deteriorated.

Figure 4:
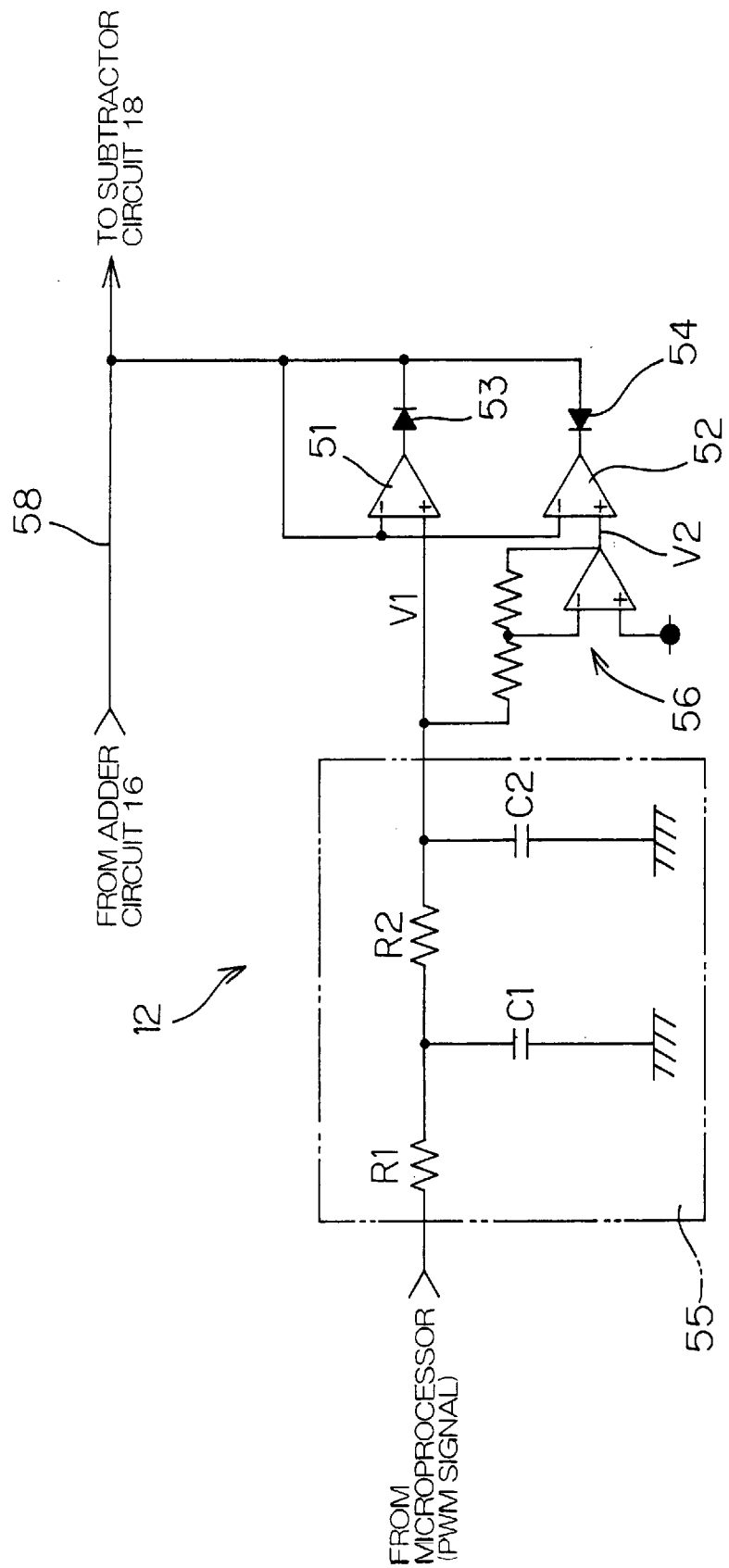
FIG. 4 is a diagram for explaining an exemplary construction of a limiter circuit.

FIG. 4 is an electric circuit diagram illustrating an exemplary construction of the limiter circuit 12. The limiter circuit 12 has a pair of operation amplifiers 51 and 52 connected to a line 58 between the adder circuit 16 and the subtractor circuit 18 via diodes 53 and 54, respectively. One 51 of the operation amplifiers is adapted to set a lower limit of a left-turn torque output motor driving command signal (a motor driving command signal for commanding for generation of a torque for left-turn steering). An output terminal of the operation amplifier 51 is connected to the line 58 via the diode 53, and the motor driving command signal is inputted from the line 58 to an inverted input terminal thereof. The other operation amplifier 52 is adapted to set an upper limit of a right-turn torque output motor driving command signal (a motor driving command signal for commanding for generation of a torque for right-turn steering). An output terminal of the operation amplifier 52 is connected to the line 58 via the diode 54, and the motor driving command signal is inputted from the line 58 to an inverted input terminal thereof.

A limiter command voltage V1 is inputted to a non-inverted input terminal of the operation amplifier 51 from an integrator circuit 55 constituted by resistors R1, R2 and capacitors C1, C2. A limiter command voltage V2 generated by inverting the limiter command voltage from the integrator circuit 55 by the operation amplifier 56 is inputted to a non-inverted input terminal of the operation amplifier 52. A limiter value command PWM signal (a signal having a pulse width according to the magnitude of the steering torque) is applied to the integrator circuit 55 from the microprocessor 21. The microprocessor 21 variably sets a limiter command value (limitation value) by changing the pulse width of the limiter value command PWM signal. That is, the integrator circuit 55 generates a DC voltage according to the pulse width W of the limiter value command PWM signal as the limiter command voltage.

When a signal (left-turn torque output motor driving command signal) which is lower than the limiter command voltage V1 is inputted to the operation amplifier 51 via the line 58, a voltage which is equivalent to a difference between this signal and the limiter command voltage V1 is applied to the line 58 via the diode 53. When a signal (right-turn torque output motor driving command signal) which is higher than the limiter command voltage V2 is inputted to the operation amplifier 52 via the line 58, a voltage which is equivalent to a difference between this signal and the limiter command voltage V2 is led to the ground from the line 58 via the diode 54.

Thus, the limiter circuit 12 can be realized by a simplified circuit construction employing the operation amplifiers.

Figure 5:
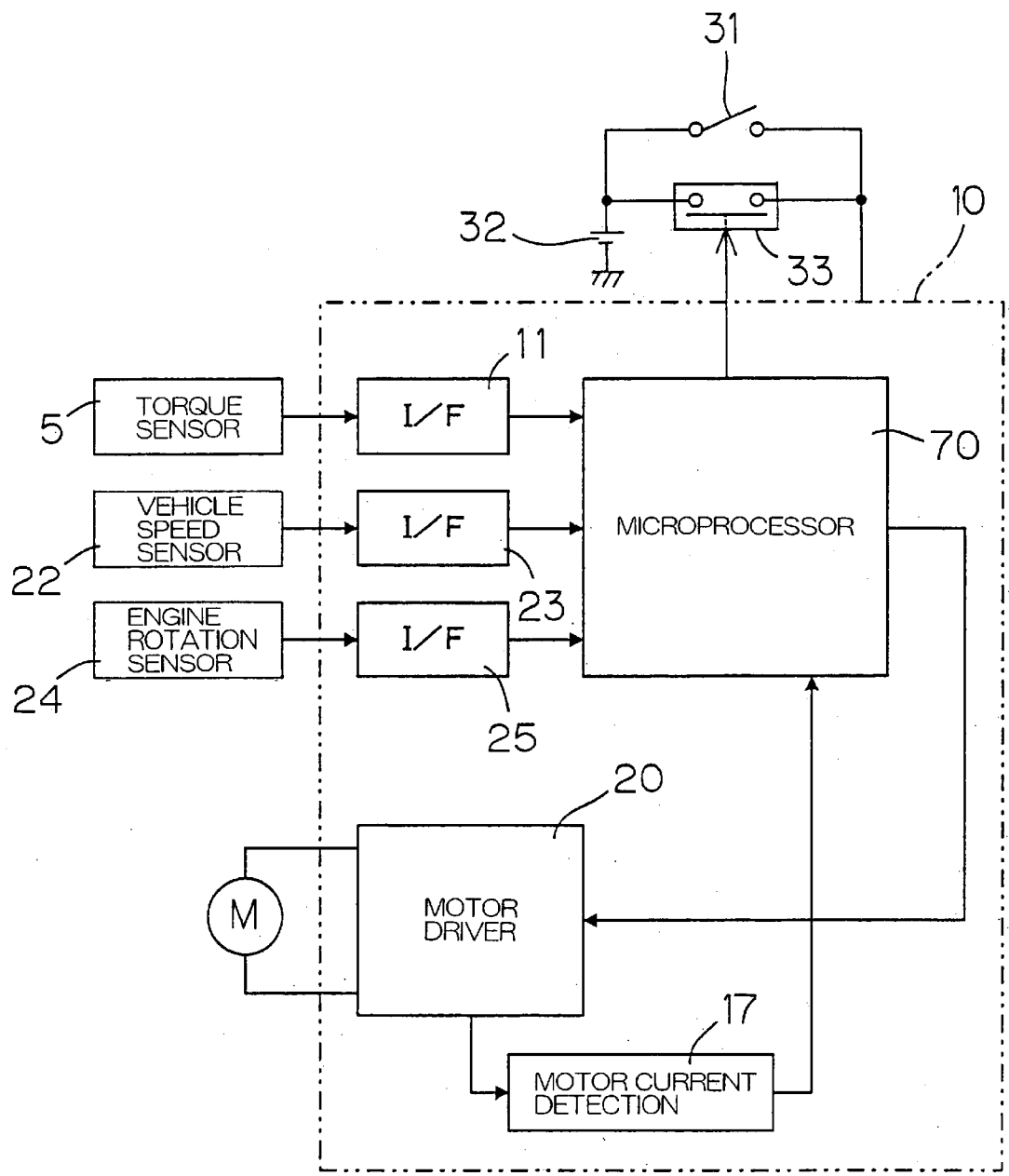
FIG. 5 is a block diagram illustrating the electrical construction of an electric power steering system according to a second embodiment of the invention.

FIG. 5 is a block diagram illustrating the electrical construction of an electric power steering system according to a second embodiment of the invention. In FIG. 5, components common to those illustrated in FIG. 1 are denoted by the same reference characters as in FIG. 1.

Although the limiter circuit 12 and the assist characteristic determining circuit 14 are each comprised of an analog circuit in the arrangement shown in FIG. 1, a microprocessor 70 provides the functions of these circuits through a software-based process by executing programs. Therefore, the torque signal from the torque sensor 5 is inputted to the microprocessor 70 from the interface circuit 11, and the microprocessor 70 inputs the motor driving PWM signal to the motor driver 20.

Figure 6:
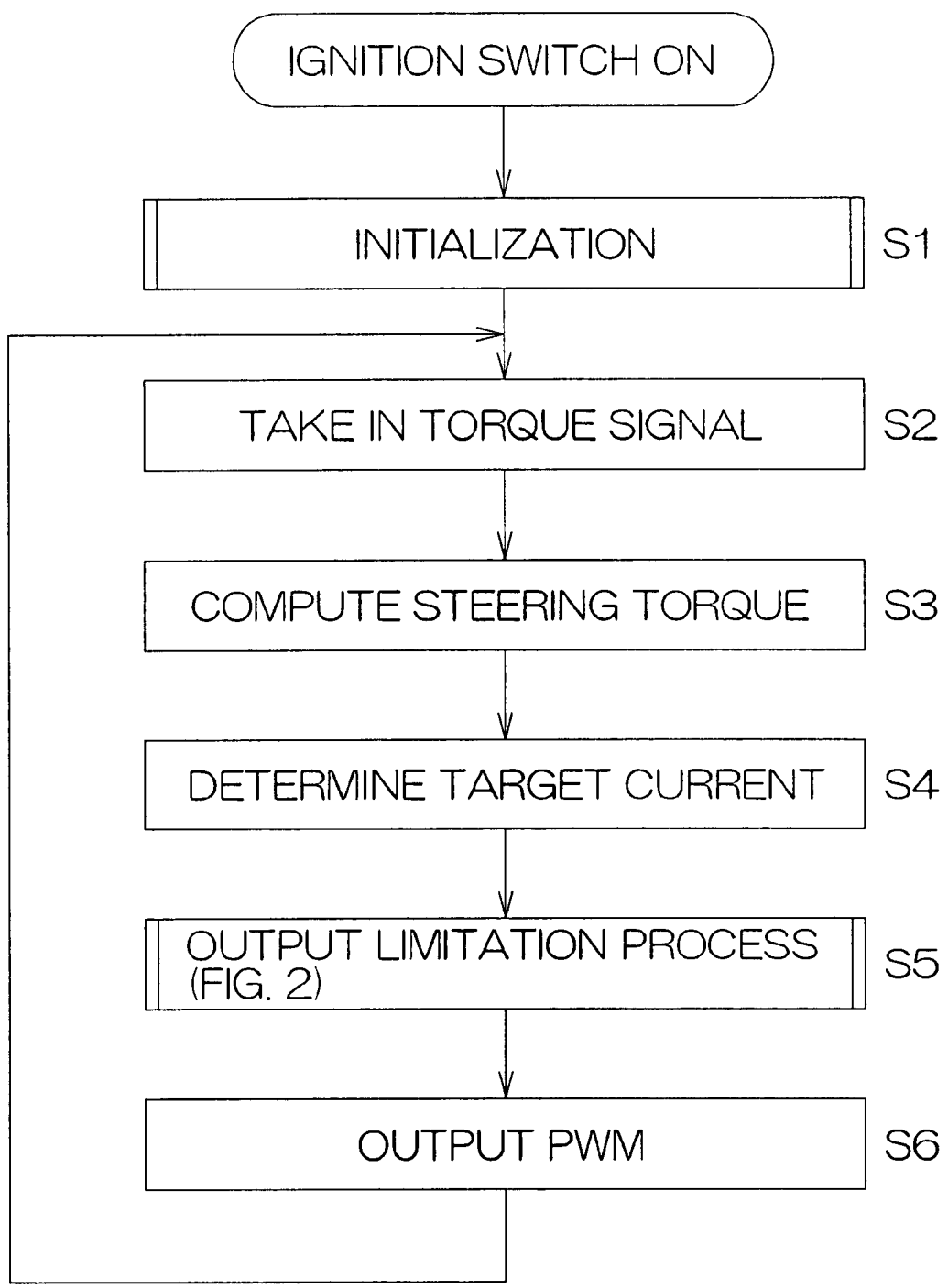
FIG. 6 is a flow chart for explaining an operation to be performed immediately after the ignition switch is turned on in accordance with the second embodiment.

FIG. 6 is a flow chart for explaining an operation to be performed by the microprocessor 70 at the start of the electric power steering system. Immediately after the ignition switch 31 is turned on, the microprocessor 70 performs an initialization process (Step S1). As long as the ignition switch 31 is conductive after the relay 33 is brought into conduction, the microprocessor 70 keeps the relay 33 in conduction.

Subsequently, a torque signal from the torque sensor 5 is taken in via the interface circuit 11 (Step S2).

The torque signal is subjected to a steering torque computation process (Step S3) to determine a steering torque value corresponding to the torque signal. A target current value (motor driving command signal) to be supplied to the electric motor M is determined on the basis of the steering torque value (Step S4), and subjected to an output limitation process (Step S5). The output limitation process is performed, for example, by multiplying the target current value determined in Step S4 by a limitation factor α (=(100−limitation value)/100). The limitation factor α, which corresponds to the limitation value determined in accordance with the characteristic relation shown in FIG. 2, is determined in accordance with the steering torque detected by the torque sensor 5.

A PWM driving signal is generated in accordance with the target current value subjected to the output limitation process (Step S6), and supplied to the motor driver 20.

Thereafter, a process sequence from Step S2 is repeated, and the limitation factor α is variably set in accordance with the steering torque in the output limitation process (Step S5). Once the limitation factor α is set at a higher level, the limitation factor α is not reduced to a lower level unless the system is stopped. Therefore, the limitation factor α finally reaches 100%, whereby the target current value is no longer limited.

Figure 7:
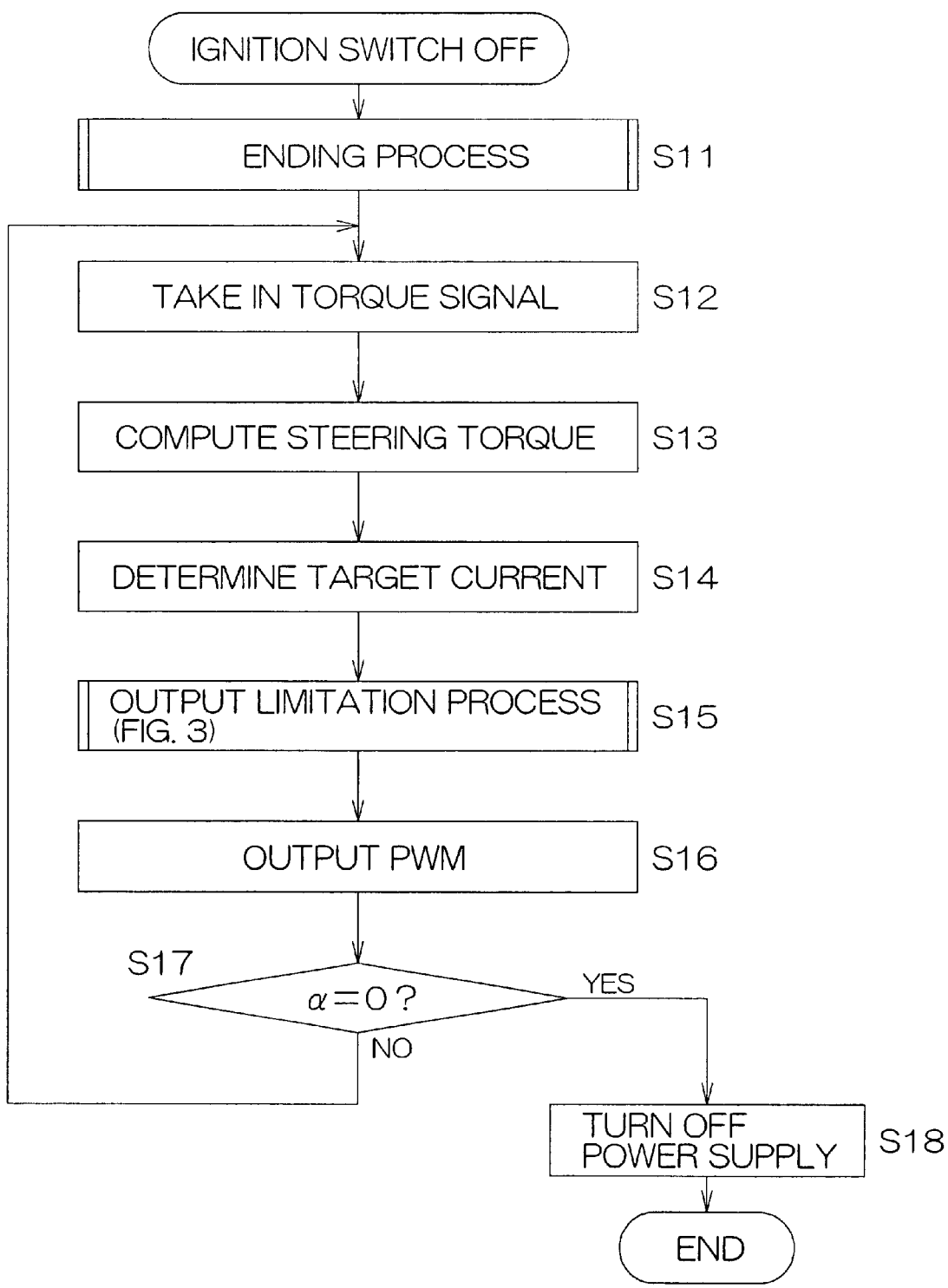
FIG. 7 is a flow chart for explaining an operation to be performed immediately after the ignition switch is turned off in accordance with the second embodiment.

FIG. 7 is a flow chart for explaining an operation to be performed by the microprocessor 70 at the stop of the electric power steering system. Immediately after the ignition switch 31 is turned off, an ending process (Step S11) is performed, and then a torque signal is read in (Step S12).

The torque signal thus read is subjected to a steering torque computation process (Step S13) to determine a steering torque value corresponding to the torque signal. A target current value (motor driving command signal) is determined on the basis of the steering torque value (Step S14). The target current value is subjected to an output limitation process (Step S15) in accordance with the characteristic relation shown in FIG. 3. A PWM driving signal generated in accordance with the target current value subjected to the output limitation process is applied to the motor driver 20 (Step S16).

If the limitation factor α is equal to zero (YES in Step S17), the relay 33 is cut off to stop the power supply to the controller 10 (Step S18). A process sequence from Step S12 is repeated until the limitation factor a is reduced to zero.

In the output limitation process, the target current value is multiplied by the limitation factor α (=(100−limitation value)/100) according to the torque signal (the magnitude of the steering torque) read in Step S12. Once the limitation factor α is set at a lower level, the limitation factor α is not increased even if the steering torque is thereafter increased.

When some abnormality occurs, the microprocessor 70 performs a fail-safe process in substantially the same manner as shown in FIG. 7, except that the micro processor 70 performs a normal state recovery monitoring process to check if the system is restored to a normal state.

After the system is deactuated when it is judged that an abnormality has occurred, the system is restored to the normal state and resumed in substantially the same manner as in FIG. 6.

In accordance with this embodiment, the output limitation process to be performed by the microprocessor 70 at the start and stop of the operation of the electric power steering system is software-based to provide the same effect as described in the first embodiment.

Figure 8A:
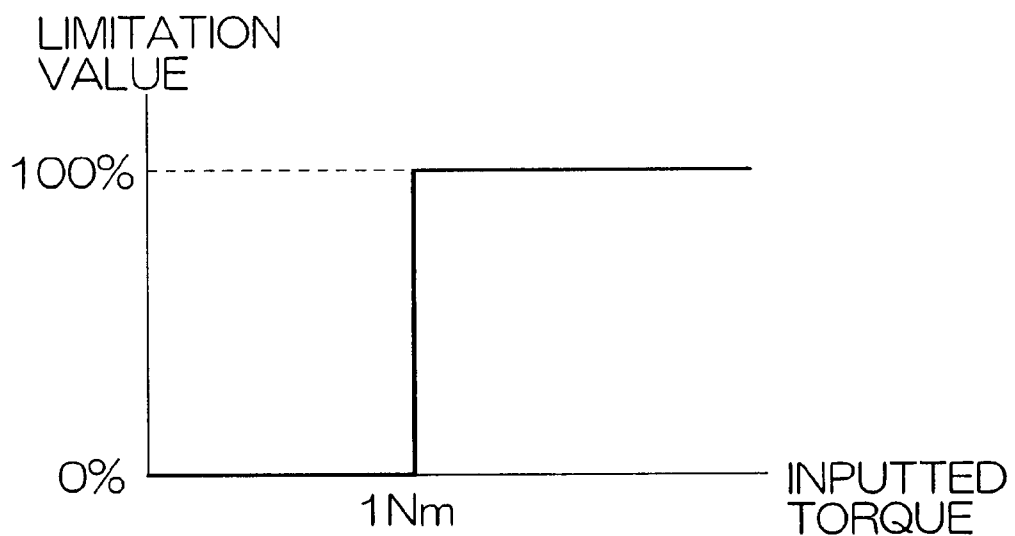
FIGS. 8A and 8B are characteristic diagrams illustrating exemplary settings of a limitation value for a steering torque.
Figure 8B:
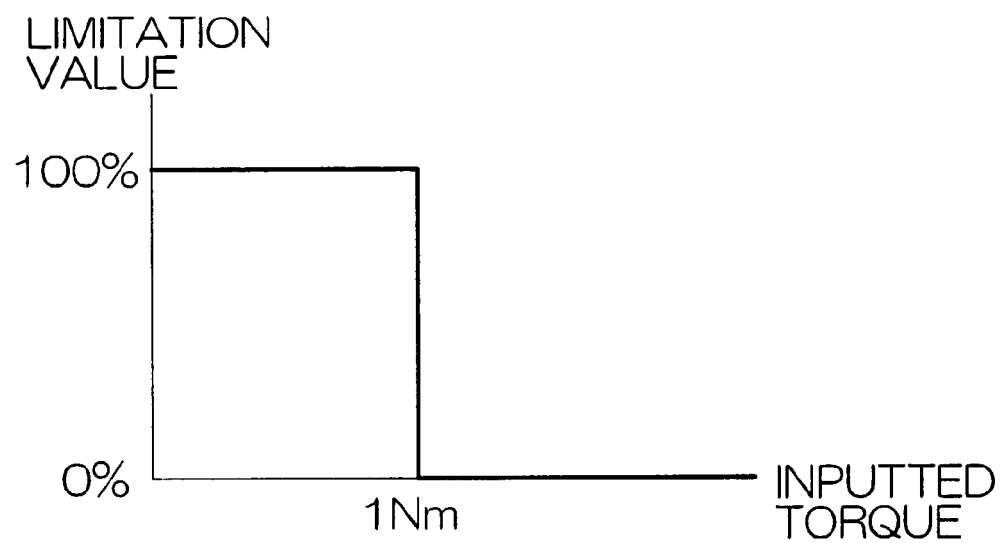

While the two embodiments of the present invention have thus been described, the invention may be embodied in any other ways. Although the limitation value is set in a linearly variable manner for a steering torque range between 1 Nm and 3 Nm (FIGS. 2 and 3), this is merely illustrative. For example, the limitation value may be shifted between 0% and 100% at a predetermined steering torque value (e.g., 1 Nm) as shown in FIG. 8A (at the start of the operation) and in FIG. 8B (at the stop of the operation). Alternatively, the limitation value may be shifted between discrete three or more levels in accordance with the steering torque value. Further, the limitation value may be set in a non-linearly variable manner for a predetermined steering torque range. In any case, the limitation value is preferably set at a higher level as the steering torque increases at the start of the operation of the electric power steering system. Further, the limitation value is preferably set at a lower level as the steering torque increases at the stop of the operation of the electric power steering system.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under the Convention on the basis of Japanese Patent Application No. 11-210231 filed to the Japanese Patent Office on Jul. 26, 1999, the disclosure thereof being incorporated herein by reference.

What is claimed is:

1. An electric power steering system, which employs an electric motor as a drive source to apply a steering assist force to a steering mechanism mounted on a motor vehicle in accordance with an operation of an operating member, the electric power steering system comprising:

a torque sensor which detects a steering torque applied to the operation member and outputs a torque signal in accordance with the detected steering torque;

a motor driving control circuit which outputs a motor driving command signal for driving the electric motor on the basis of the torque signal outputted from the torque sensor; and an output limitation circuit which limits the motor driving command signal in accordance with the magnitude of the steering torque detected by the torque sensor at at least one of a start and a stop of the operation of the electric power steering system.

2. An electric power steering system as set forth in claim 1, wherein at the start of the operation of the electric power steering system, the output limitation circuit more heavily limits the motor driving command signal when the steering torque detected by the torque sensor is large than when the steering torque detected by the torque sensor is small.

3. An electric power steering system as set forth in claim 2, wherein the output limitation circuit sets a limitation value indicative of a degree of the limitation of the motor driving command signal such that the degree of the limitation does not increase with time at the start of the operation of the electric power steering system.

4. An electric power steering system as set forth in claim 1, wherein at the stop of the operation of the electric power steering system, the output limitation circuit more heavily limits the motor driving command signal when the steering torque detected by the torque sensor is small than when the steering torque detected by the torque sensor is large.

5. An electric power steering system as set forth in claim 4, wherein the output limitation circuit sets a limitation value indicative of the degree of the limitation of the motor driving command signal such that the degree of the limitation does not decrease with time at the stop of the operation of the electric power steering system.

* * * * *